(12) United States Patent
Salter et al.

(10) Patent No.: US 10,040,392 B2
(45) Date of Patent: Aug. 7, 2018

(54) VEHICLE PUDDLE LAMP ASSEMBLY GENERATING MOVING IMAGE AND METHOD

(71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/343,498

(22) Filed: Nov. 4, 2016

(65) Prior Publication Data

US 2017/0050558 A1 Feb. 23, 2017

Related U.S. Application Data

(63) Continuation-in-part of application No. 15/072,661, filed on Mar. 17, 2016, which is a continuation of
(Continued)

(51) Int. Cl.
*G03B 21/16* (2006.01)
*B60Q 1/32* (2006.01)
(Continued)

(52) U.S. Cl.
CPC ........... *B60Q 1/323* (2013.01); *B60Q 1/0023* (2013.01); *B60Q 1/24* (2013.01); *B60Q 1/2665* (2013.01);
(Continued)

(58) Field of Classification Search
CPC .................................. G03B 21/16; F21V 7/04
(Continued)

(56) References Cited

U.S. PATENT DOCUMENTS 6,152,590 A    11/2000 Furst et al.
6,685,347 B2    2/2004 Grutze
(Continued)

FOREIGN PATENT DOCUMENTS

DE    102015109381 A1    1/2016
EP    2674328 A2 * 12/2013 ............... B60Q 3/02
(Continued)

OTHER PUBLICATIONS

Machine Translation of EP 2674328 A2.*
(Continued)

*Primary Examiner* — Steven H Whitesell Gordon
*Assistant Examiner* — Jerry Brooks
(74) *Attorney, Agent, or Firm* — Jason Rogers; Price Heneveld LLP

(57) ABSTRACT

A vehicle puddle lamp assembly is provided that includes a plurality of light projectors located on a vehicle and configured to illuminate different lighted image patterns on a ground surface adjacent to the vehicle. The vehicle puddle lamp assembly includes a controller for sequentially activating the plurality of light projectors to generate an animated lighted image on the ground surface. The animated image moves in a location based on a door position.

20 Claims, 13 Drawing Sheets

Related U.S. Application Data application No. 13/871,065, filed on Apr. 26, 2013, now Pat. No. 9,321,395.

(51) Int. Cl.

| | | |
|---|---|---|
| *B60Q 1/26* | (2006.01) | |
| *B60R 1/12* | (2006.01) | |
| *B60Q 1/24* | (2006.01) | |
| *B60Q 1/00* | (2006.01) | |
| *G03B 21/20* | (2006.01) | |
| *G03B 29/00* | (2006.01) | |
| *H05B 37/02* | (2006.01) | |

(52) U.S. Cl.
CPC ............... *B60Q 1/32* (2013.01); *B60R 1/12* (2013.01); *G03B 21/206* (2013.01); *G03B 29/00* (2013.01); *H05B 37/0227* (2013.01); *H05B 37/0281* (2013.01); *B60Q 2400/40* (2013.01); *B60Q 2400/50* (2013.01)

(58) Field of Classification Search
USPC ........................................................ 353/1, 5
See application file for complete search history.

(56) References Cited

U.S. PATENT DOCUMENTS

| | | | |
|---|---|---|---|
| 6,902,305 | B2 | 6/2005 | Wainwright |
| 7,175,321 | B1 | 2/2007 | Lopez |
| 9,321,395 | B2 | 4/2016 | Ammar et al. |
| 2002/0159741 | A1 | 10/2002 | Graves et al. |
| 2005/0117364 | A1 | 6/2005 | Rennick et al. |
| 2006/0104075 | A1 | 5/2006 | Misawa |
| 2007/0053195 | A1* | 3/2007 | Alberti ................. B60Q 1/2665 362/494 |
| 2008/0285293 | A1 | 11/2008 | Sato |
| 2009/0115639 | A1 | 5/2009 | Profke et al. |
| 2010/0253919 | A1 | 10/2010 | Douglas |
| 2010/0277696 | A1 | 11/2010 | Huebner |
| 2010/0321945 | A1 | 12/2010 | Lang et al. |
| 2010/0321946 | A1 | 12/2010 | Dingman |
| 2011/0128141 | A1 | 6/2011 | Purks et al. |
| 2011/0260848 | A1* | 10/2011 | Rodriguez Barros ................. B60Q 1/2665 340/438 |
| 2011/0273671 | A1 | 11/2011 | Chu |
| 2012/0092623 | A1* | 4/2012 | Huebner ............ G03B 21/2013 352/81 |
| 2012/0280528 | A1 | 11/2012 | Dellock et al. |
| 2014/0218212 | A1* | 8/2014 | Nykerk ................. B60Q 1/0023 340/901 |
| 2015/0353000 | A1 | 12/2015 | Kowatzki |
| 2016/0193959 | A1 | 7/2016 | Ammar et al. |
| 2018/0010372 | A1* | 1/2018 | Rucha ................... E05C 17/006 |

FOREIGN PATENT DOCUMENTS

| | | |
|---|---|---|
| KR | 20110133387 A | 12/2011 |
| WO | 2016012651 A1 | 1/2016 |

OTHER PUBLICATIONS

"SRT LED Door Light Projector," www.mrkustom.com, Mr. Kustom Chicago, Copyrighted 2012, 7 pages.

"2008, 2009, 2010, 2011, 2012 Challenger MPAR Door Light Projector," www.northamericantuning.com, Cpyrighted 2012 North American Tuning LLC, 7 pages.

"Projector Spotlight Shadow Welcome Light Laser Shadow Puddle Lamp for Kawasaki (4th GEN), #3185," www.buy4car.com, 7 pages, dated Jul. 29, 2016.

\* cited by examiner

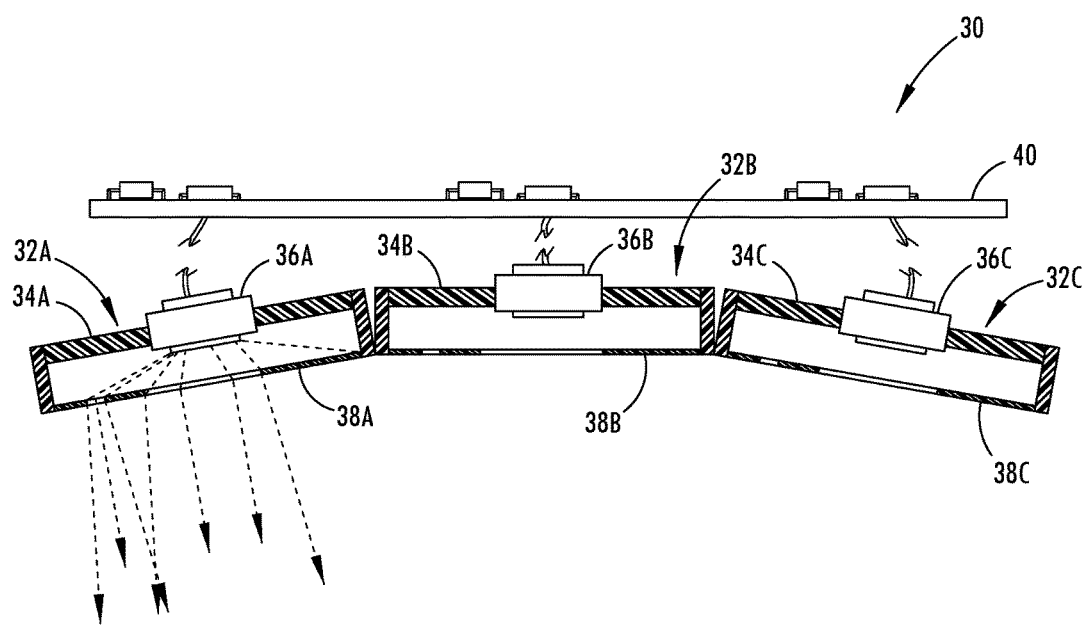
FIG. 3
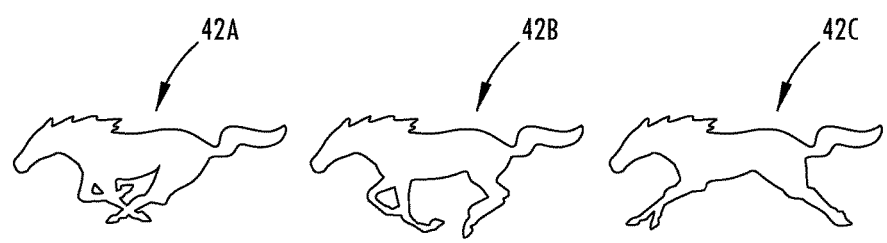
FIG. 4A   FIG. 4B   FIG. 4C

VEHICLE PUDDLE LAMP ASSEMBLY GENERATING MOVING IMAGE AND METHOD

CROSS-REFERENCE TO RELATED APPLICATIONS

This application is a continuation-in-part of U.S. patent application Ser. No. 15/072,661, filed on Mar. 17, 2016, entitled "VEHICLE LAMP ASSEMBLY GENERATING ANIMATED IMAGE AND METHOD," which is a continuation of U.S. patent application Ser. No. 13/871,065, filed on Apr. 26, 2013, now issued as U.S. Pat. No. 9,321, 395, entitled "VEHICLE PUDDLE LAMP ASSEMBLY GENERATING ANIMATED IMAGE AND METHOD." The aforementioned related applications are hereby incorporated by reference.

FIELD OF THE INVENTION

The present invention generally relates to vehicle lighting, and more particularly relates to a vehicle puddle lamp assembly for providing an illuminated image on the ground surface adjacent to the vehicle.

BACKGROUND OF THE INVENTION

Automotive vehicles are increasingly employing lighting devices such as puddle lamps for enhanced lighting applications. Puddle lamps have been employed to illuminate a beam of light onto the ground surface in an area adjacent to the vehicle door when the door is to be opened. The puddle lamp thereby provides illumination to a driver or passenger of the vehicle to observe the area for approaching or stepping out of the vehicle, such as the existence of a puddle of water.

SUMMARY OF THE INVENTION

According to one aspect of the present invention, a vehicle puddle lamp assembly is provided. The vehicle puddle lamp assembly includes a plurality of light projectors located on a vehicle and configured to illuminate different lighted image patterns on a surface adjacent to the vehicle, and a sensor sensing a passenger door in an open positon. The vehicle puddle lamp assembly also includes a controller sequentially activating the plurality of light projectors to generate a moving animated lighted image on the ground surface when the door is sensed in the open position.

According to another aspect of the present invention, a vehicle puddle lamp assembly is provided. The vehicle puddle lamp assembly includes a plurality of light projectors located on a vehicle and configured to illuminate different lighted image patterns on a surface adjacent to the vehicle, and a sensor sensing a passenger door position. The vehicle puddle lamp assembly also includes a controller sequentially activating the plurality of light projectors to generate a moving lighted image on the ground surface based on the door position.

According to a further aspect of the present invention, a method of generating a lighted image with a vehicle puddle lamp assembly is provided. The method includes the steps of receiving a signal to activate a vehicle puddle lamp, determining a vehicle door moving to an open position, and sequentially activating a plurality of light projectors configured to illuminate different light patterns on a surface adjacent to the vehicle to generate a lighted image that moves on the ground surface.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a cross-sectional view taken through line of FIG. 2 further illustrating the light projectors;

FIGS. 4A-4C are images of three different lighted image patterns generated by the three light projectors, according to one embodiment;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
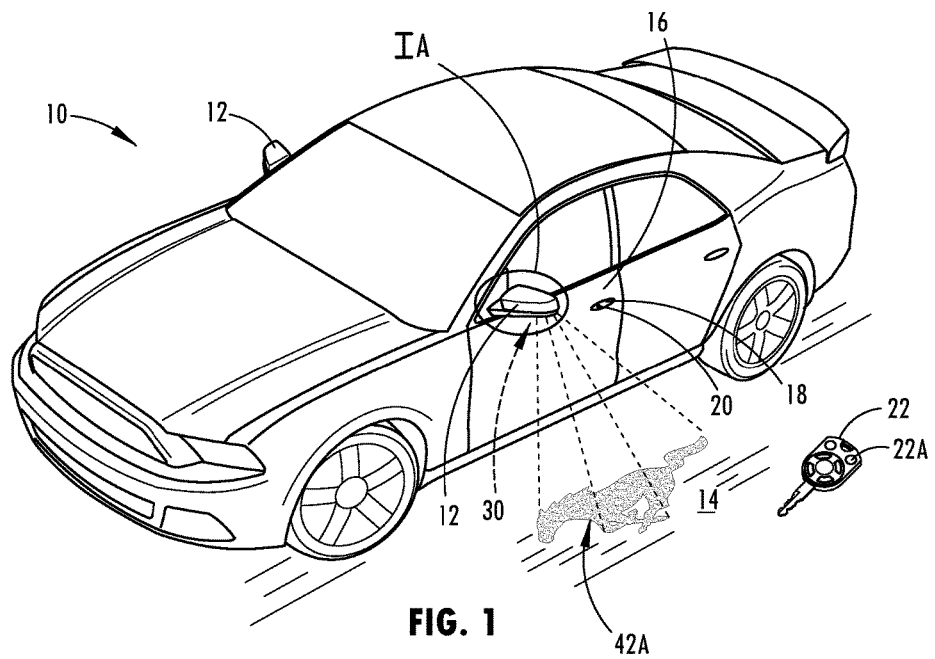
FIG. 1 is a perspective view of an automotive vehicle employing a puddle lamp assembly in an exterior side view mirror of a vehicle, according to one embodiment.
Figure 1A:
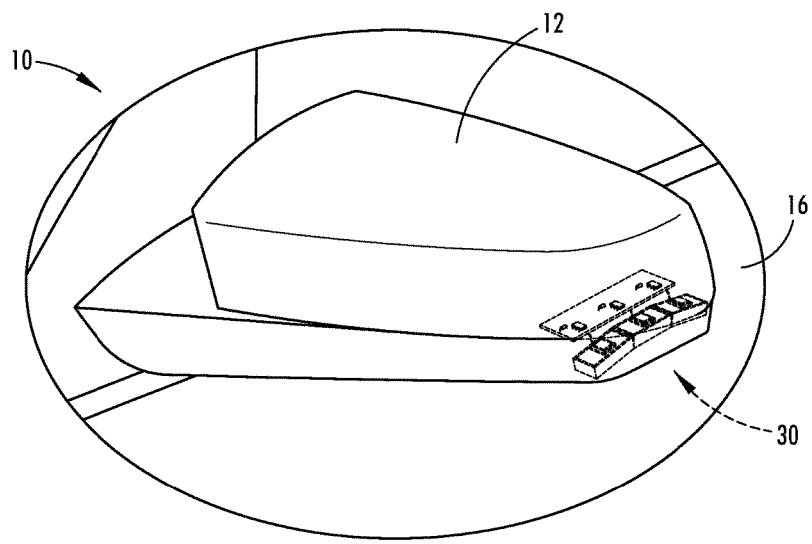
FIG. 1A is an enlarged view of section IA of FIG. 1 illustrating the exterior side view mirror with a plurality of light projectors employed by the lamp assembly.

Referring to FIGS. 1 and 1A, an automotive vehicle 10 is generally illustrated employing a vehicle puddle lamp assembly 30, according to one embodiment. The vehicle 10 shown is one example of a passenger vehicle having a pair of exterior rearview mirrors 12 mounted on opposite lateral sides of the vehicle generally near the front side of the front passenger doors 16, as is generally known in the art. Passenger doors 16 each include a handle 18 with a latch mechanism to enable a user to engage and unlatch the latch mechanism to open the door for access to enter and exit the vehicle. A remote key fob 22 is shown which may be operated by a user to activate various features including door lock and unlock functions. The handle 18 is shown including a proximity sensor 20, such as a capacitive sensor, for sensing the hand of the user in close proximity to the handle 18.

The vehicle puddle lamp assembly 30 is shown installed on an exterior rearward facing side view mirror 12, generally in a position configured to project an animated lighted image onto the ground surface 14 adjacent to a passenger side door of the vehicle 10. The lamp assembly 30 includes a plurality of light projectors located on the vehicle shown in one embodiment installed in the lower housing of the mirror 12. In the embodiment shown, three light projectors are configured in a linear array, each oriented to illuminate a different lighted image on the same general area of the ground surface 14. While three light projectors are shown and described herein as part of the puddle lamp assembly, it should be appreciated that two or more light projectors may be employed in various configurations and orientations. It should further be appreciated that the light projectors may be located at different locations on the vehicle such as in the vehicle door handle, the door itself, a side fender, a bumper, a roof rail or other locations sufficient to project a lighted image onto the ground surface 14.

The vehicle puddle lamp assembly 30 is controlled by a controller to sequentially activate the plurality of light projectors consecutively one at a time such that a corresponding lighted image pattern is output from each projector and projected onto the ground surface 14 one at a time at a sufficiently rapid rate to generate an animated lighted image which has the appearance of a moving image. In the specific example shown and described herein, an image of a mustang 42A which may be a logo and may serve as a trademark is shown in three different lighted image patterns in which the legs of the mustang appear to move due to the sequential and rapid consecutive activations of the three light projectors. It should be appreciated that other images having different patterns, sizes, and light colors may be generated.

The puddle lamp assembly 30 may be activated in response to a user activating the door unlock switch on the key fob 22 when the user is within signal communication range of the vehicle 10. Upon activation of the door unlock switch or button, the vehicle puddle lamp assembly 30 is turned on to generate the animated lighted image, such as the running mustang. The lamp assembly 30 may remain on for a predetermined time period, such as two minutes, and may be turned off prior to the predetermined time period when a user's hand is detected by the proximity sensor 20 in close proximity to or actuating the door handle 18. Accordingly, the appearance of the moving lighted image provides an animated lighted image and serves as a puddle lamp to illuminate the ground surface 14 adjacent to the vehicle door to enable the user to approach and access the vehicle 10 and view the ground surface 14 proximate thereto.

Referring to FIGS. 2A-4C, the lamp assembly 30 is further illustrated having three light projectors 32A-32C for generating three different lighted image patterns 42A-42C. The lamp assembly 30 includes first light projector 32A, second light projector 32B and third light projector 32C, all shown arranged in a linear array and slightly angled relative to one another so as to provide light illumination onto the same general area on the ground surface 14. Each of the light projectors includes a housing 34A-34C, a light source 36A-36C, such as light emitting diodes (LEDs), and an image filter 38A-38C. The image filters 38A-38C are arranged within the light output windows of the corresponding light sources 36A-36C, respectively, such that light output by the light sources 36A-36C is illuminated onto and passes through the image filters 38A-38C one at a time to provide the lighted image patterns 42A-42C projecting onto the ground surface 14. The image filters 38A-38C may include a light transparent film having either a positive or negative light transparent image. Additionally, the lamp assembly 30 is shown having a printed circuit board containing a controller having control circuitry including LED drive circuitry for controlling activation and deactivation of the light sources and hence the light projectors 32A-32C. The LEDs and filters generate a visible light such as white light or other color(s).

Figure 2A:
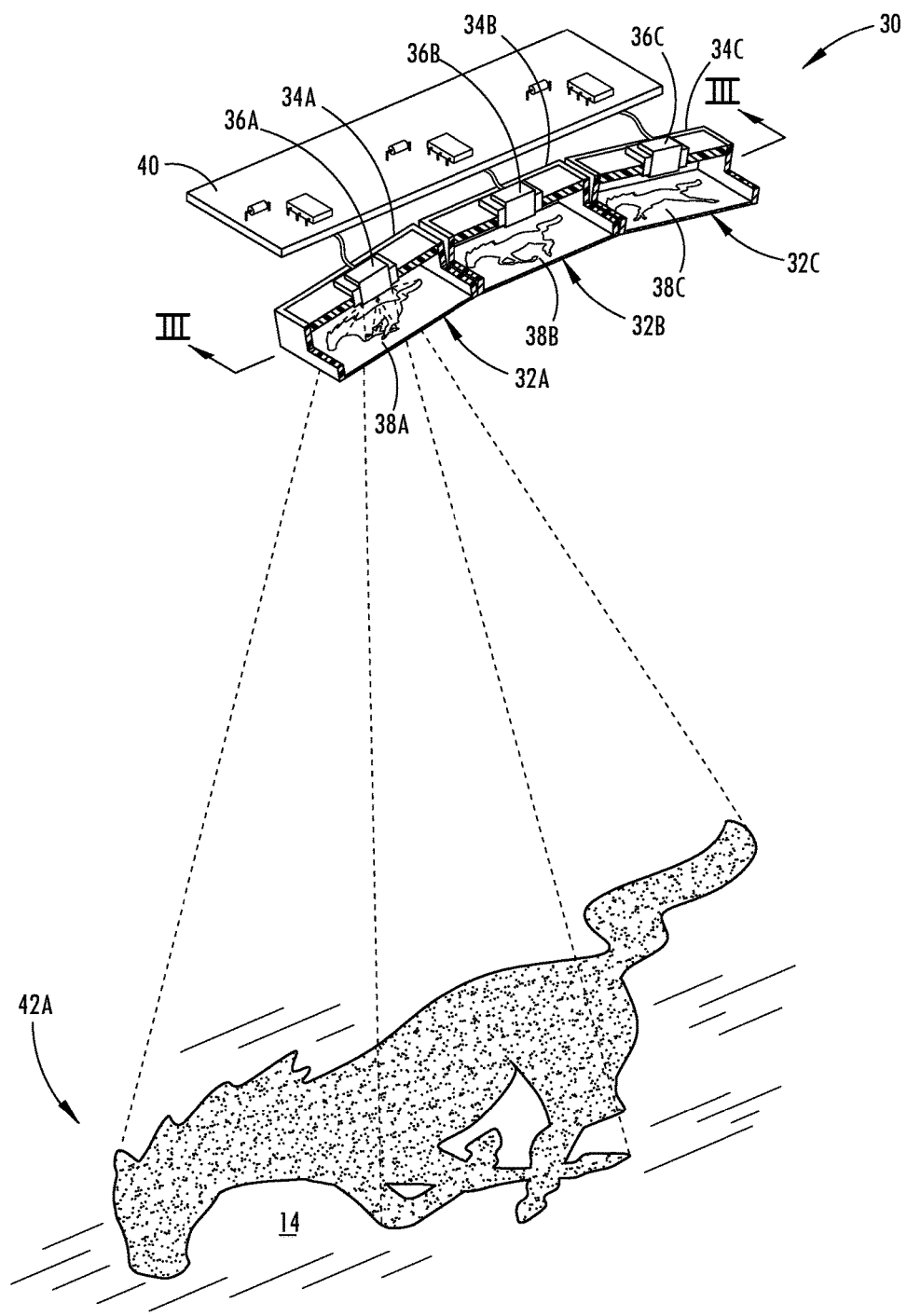
FIG. 2A is an enlarged view of the lamp assembly illustrating the projection of a first lighted image with the first projector.
Figure 2B:
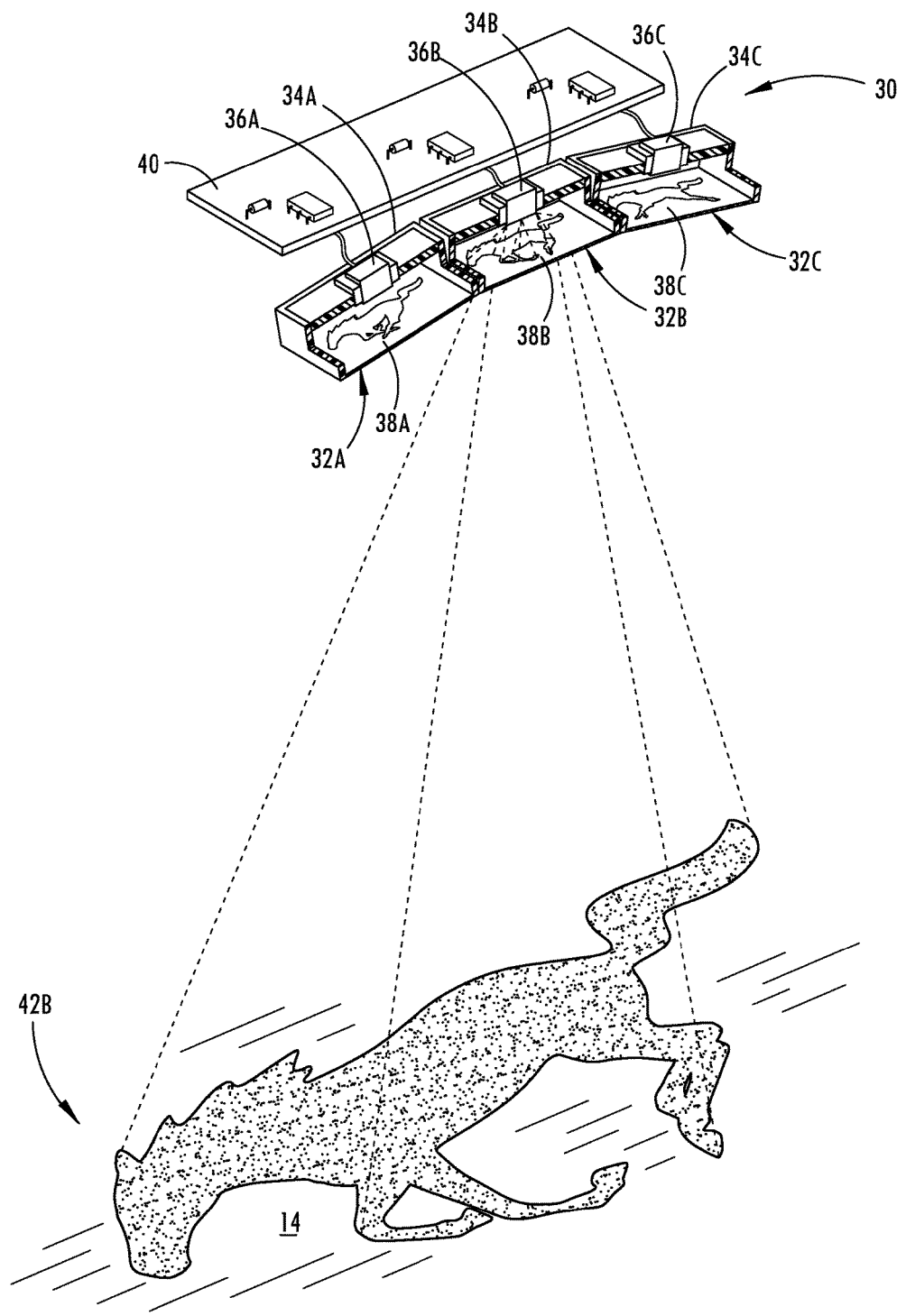
FIG. 2B is an enlarged view of the lamp assembly illustrating the projection of a second lighted image with the second projector.
Figure 2C:
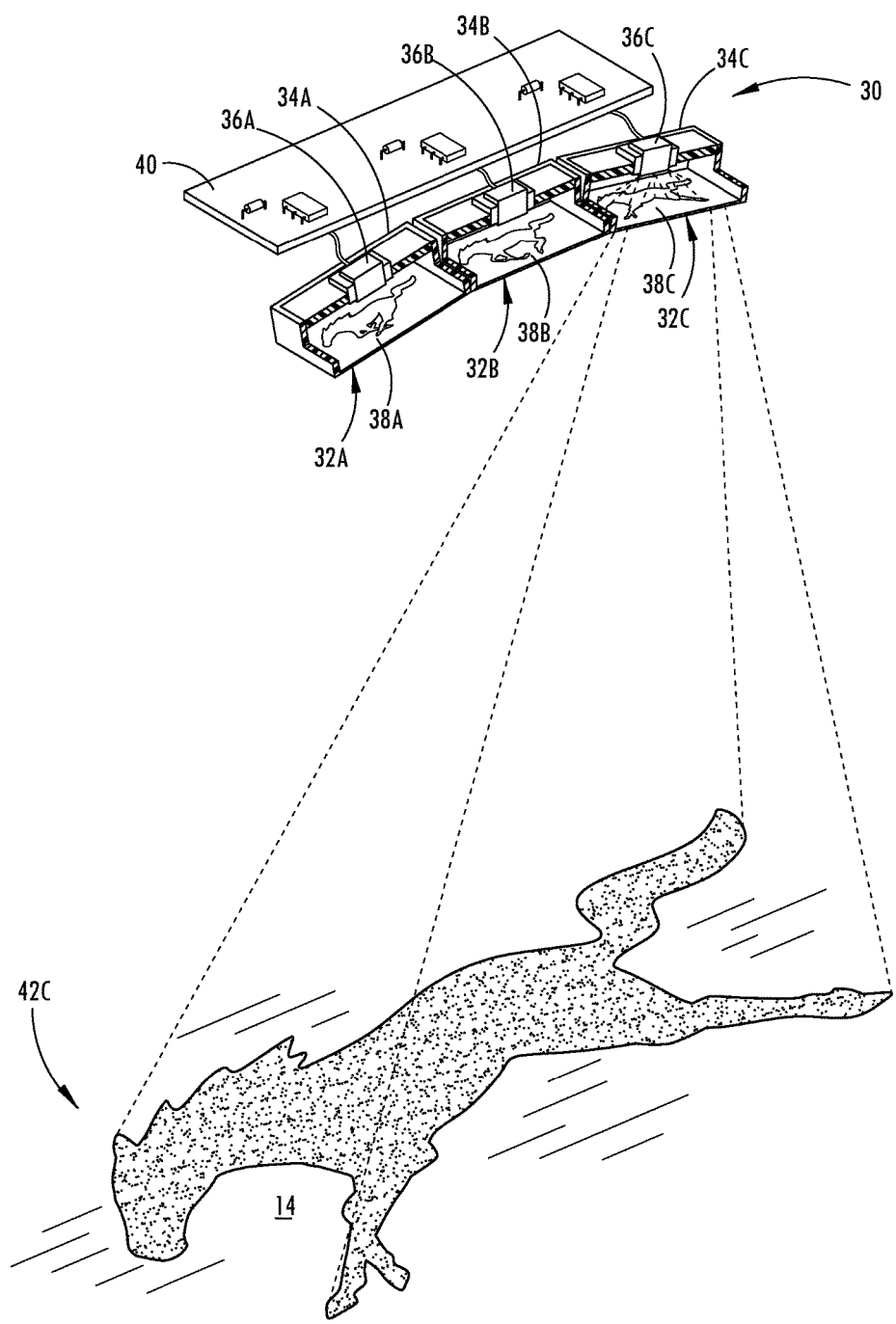
FIG. 2C is an enlarged view of the lamp assembly illustrating the projection of a third lighted image with the third projector.

In FIG. 2A, the first light projector 32A is shown activated such that the first light source 36A illuminates light onto first image filter 32A to generate a first lighted image pattern 42A on ground surface 14. In FIG. 2B, the second light projector 32B is shown activated such that the second light source 36B illuminates light onto the second image filter 38B to generate a second lighted image pattern 42B on ground surface 14. In FIG. 2C, the third light projector 32C is shown activated such that third light source 36C generates a beam of light onto the third image filter 38C to generate a third lighted image pattern 42C onto the ground surface 14. It should be appreciated that the light projectors 32A-32C are activated and deactivated one at a time in a successive sequence at a rapid rate to generate animated imaging. In doing so, each light projector may be turned on for an activation time period in the range of about 50 to 500 milliseconds, and more preferably 50 to 250 milliseconds, and then turned off and the next light projector turned on immediately so as to generate the appearance of a moving lighted image, such as an animated running mustang. The activation time period could be extended up to 1.5 seconds, according to embodiments that generate a slower moving image. The first, second and third lighted image patterns 42A-42C are further shown in FIGS. 4A-4C, respectively. With a sufficiently fast successive activation and deactivation of the light projectors, the mustang appears to be running as the legs as viewed by a user appear to move.

Figure 5:
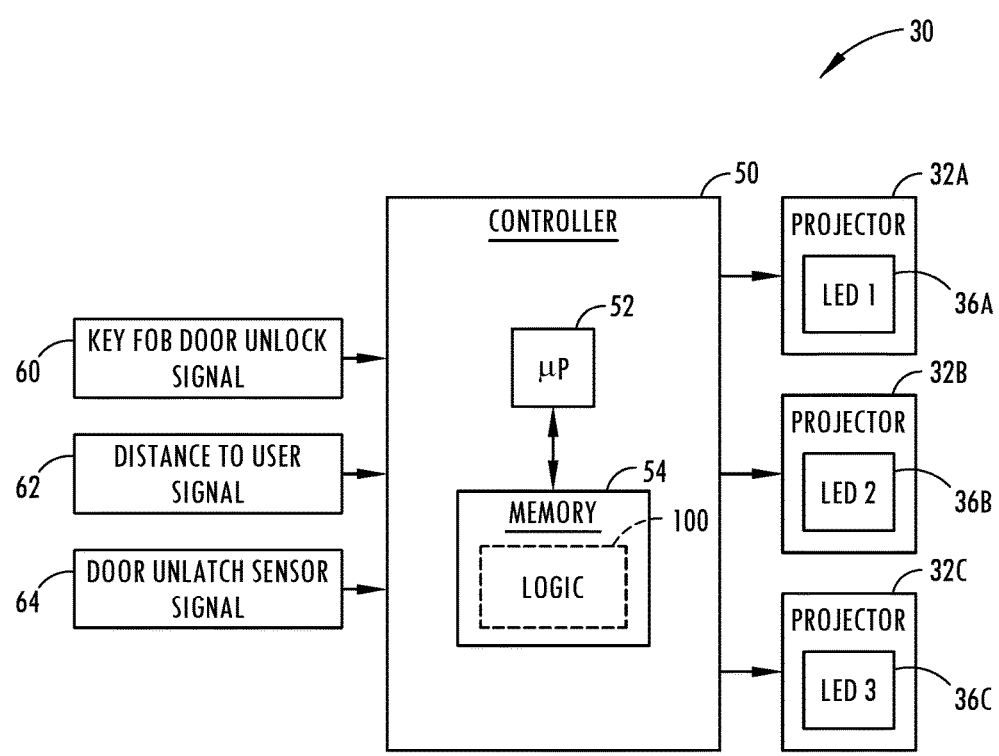
FIG. 5 is a block diagram further illustrating the puddle lamp assembly.

Referring to FIG. 5, the vehicle puddle lamp assembly 30 is further illustrated having a controller 50 receiving various inputs and controlling each of the first, second and third projectors 32A-32C, by applying signals to the light sources 36A-36C. The controller 50 may include a microprocessor 52 and memory 54 as illustrated, according to one embodiment. It should be appreciated that the controller 50 may include control circuitry such as analog and/or digital control circuitry. Stored within memory 54 and executed by a microprocessor 52 is logic 100 for processing the various inputs and controlling each of the plurality of light projectors as described herein. The inputs to the controller 50 may include a key fob door unlock signal 60 which may be made available from another controller, e.g., body control module, within the vehicle in communication with the key fob via wireless communication. Additionally, the controller 50 receives a distance to user signal 62 which is a distance that the user is detected from the vehicle. The distance to the user signal may be generated by computing distance between the vehicle and the key fob, according to one embodiment. Another controller such as a vehicle body control module may supply the distance to user signal. According to other embodiments, the distance to the user signal could be generated using other sensors, such as an ultrasonic proximity sensor. The controller 50 further receives a door unlatch sensor signal 64.

The door unlatch sensor signal may be a signal sensed by the proximity sensor in the door handle, or may be a signal detected by activation of a sensor on the key fob.

The controller 50 processes the inputs and activates the lamp assembly 30 when the key fob door unlock signal 60 is received by turning the plurality of light projectors sequentially on and off one at a time. The controller 50 may activate the lamp assembly 30 in response to other signals such as a door unlock signal generated by a door mounted switch or a door open signal, according to other embodiments. The lamp assembly 30 may be turned off when a predetermined time period expires or when a user is detected opening a vehicle door via the door unlatch sensor signal 64 according to one embodiment. The controller 30 may further determine a distance from the vehicle to a user and may control intensity and/or time of activation for each of the light projectors, according to other embodiments.

Figure 6:
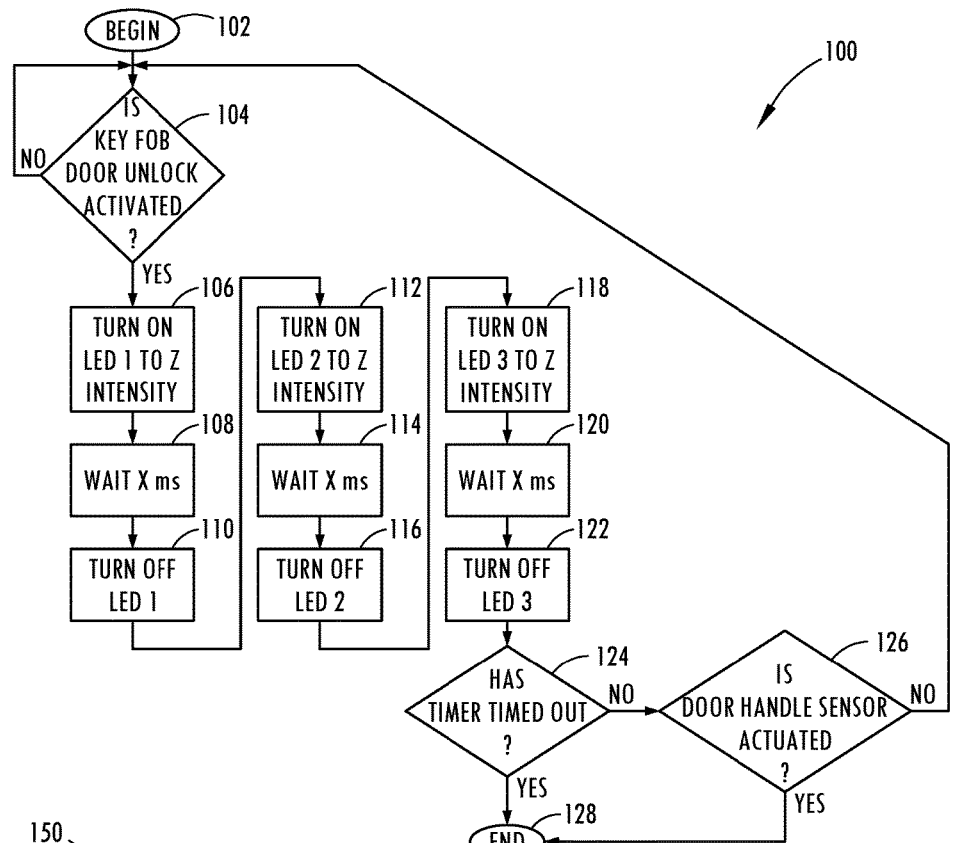
FIG. 6 is a flow diagram illustrating a method of controlling activation of the light projectors of the lamp assembly, according to one embodiment.

Referring to FIG. 6, the logic or method 100 of activating the vehicle puddle lamp assembly 30 is illustrated, according to one embodiment. Method 100 begins at step 102 and proceeds to decision step 104 to determine if the key fob door unlock button has been activated and, if not, returns. If the key fob door unlock button has been activated, method 100 proceeds to step 106 to turn on the first LED 1 to intensity Z, then proceeds to step 108 to wait for an activation time period of X milliseconds, before proceeding to step 110 to turn off the first LED 1. Accordingly, a first cycle of the first projector turning on and off is complete. Next, method 100 proceeds to step 112 to turn on the second LED 2 to an intensity Z, and then proceeds to step 114 to wait for an activation time period of X milliseconds, before turning off the second LED 2 at step 116. Thus, the second light projector has been turned on and off for a complete cycle. Next, method 100 proceeds to step 118 to turn on the third LED 3 to an intensity Z, and then proceeds to step 120 to wait for an activation time period of X milliseconds before turning off the third LED 3 at step 122. At this point, a cycle of the third projector turning on and off is complete. Following successive sequential activations and deactivations of each of the first and second and third light projectors, method 100 proceeds to decision step 124 to determine if a timer has timed out since the key fob unlock was activated and, if so, ends at step 128. If the timer has not timed out, method 100 proceeds to decision step 126 to determine if the door handle sensor has been actuated and, if so, ends at step 128. If the door handle sensor has not been actuated, method 100 returns to step 104 to repeat the successive activations and deactivations of the plurality of light projectors.

Figure 7:
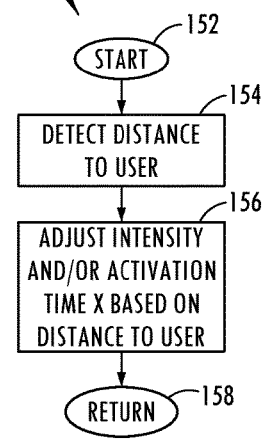
FIG. 7 is a flow diagram illustrating a routine of adjusting intensity and/or activation time of the light projectors, according to another embodiment.

Referring to FIG. 7, a method 150 for adjusting the intensity Z and/or activation time X of the light projectors of method 100 is provided, according to another embodiment. In this embodiment, method 150 begins at step 152 and proceeds to step 154 to detect a distance to the user. The distance may be detected by computing the distance between the vehicle and the key fob, according to one embodiment. According to other embodiments, proximity sensors, such as an ultrasonic sensor may be employed to detect a distance to a user. Based on the detected distance, method 150 proceeds to step 156 to adjust intensity Z and/or activation time X of the light projectors based on the distance to the user, before returning at step 158. Accordingly, as the user approaches the vehicle, the intensity of the lighted image pattern generated by each light projector may be increased and/or the speed at which the projector images are changed and the image appears to be moving may be increased. The intensity can thereby increase or decrease as the customer approaches or moves away from the vehicle. For example, if the customer is within fifty (50) feet of the vehicle, the image projectors may be turned on and activated at ten percent (10%) intensity and may ramp up to fifty percent (50%) intensity as the user moves to within a distance of twelve (12) feet of the vehicle, and then ramp to one hundred percent (100%) of the intensity as the user reaches a distance of five (5) feet from the vehicle. The X activation time may be changed to make the image appear to move at a faster or slower rate. The X activation time period may be shortened (decreased) to make the image to appear to move faster as the user approaches the vehicle and may be extended (increased) as the user moves further away from the vehicle, according to one example.

Accordingly, the vehicle puddle lamp assembly 30 advantageously provides light illumination in a region to the side of the vehicle door to allow enhanced access lighting. The lamp assembly 30 generates an animated image which gives the appearance of a moving lighted image on the ground surface adjacent to the vehicle to provide an aesthetically pleasing light illumination. It should be appreciated that the puddle lamp assembly 30 may be employed on opposite lateral sides of the vehicle as well as other locations on the vehicle to provide light illumination and a lighted animated image.

Referring now to FIGS. 8-12B, a vehicle puddle lamp assembly 230 for generating a moving animated image is shown employed on an automotive vehicle 10, according to another embodiment. The vehicle 10 shown is one example of a wheeled passenger vehicle having vehicle doors such as a front passenger door 16, as is generally known in the art. The automotive vehicle 10 may be configured similar to the vehicle 10 shown in FIG. 1, according to the first embodiment. The automotive vehicle 10 includes a driver seat 25 for seating a driver (not shown) of the vehicle 10. The passenger door 16, shown as a driver door, has an interior trim panel 17 on the interior side of the door 16. It should be appreciated that other doors on the vehicle may likewise be configured to include the vehicle puddle lamp assembly 230.

Figure 8:
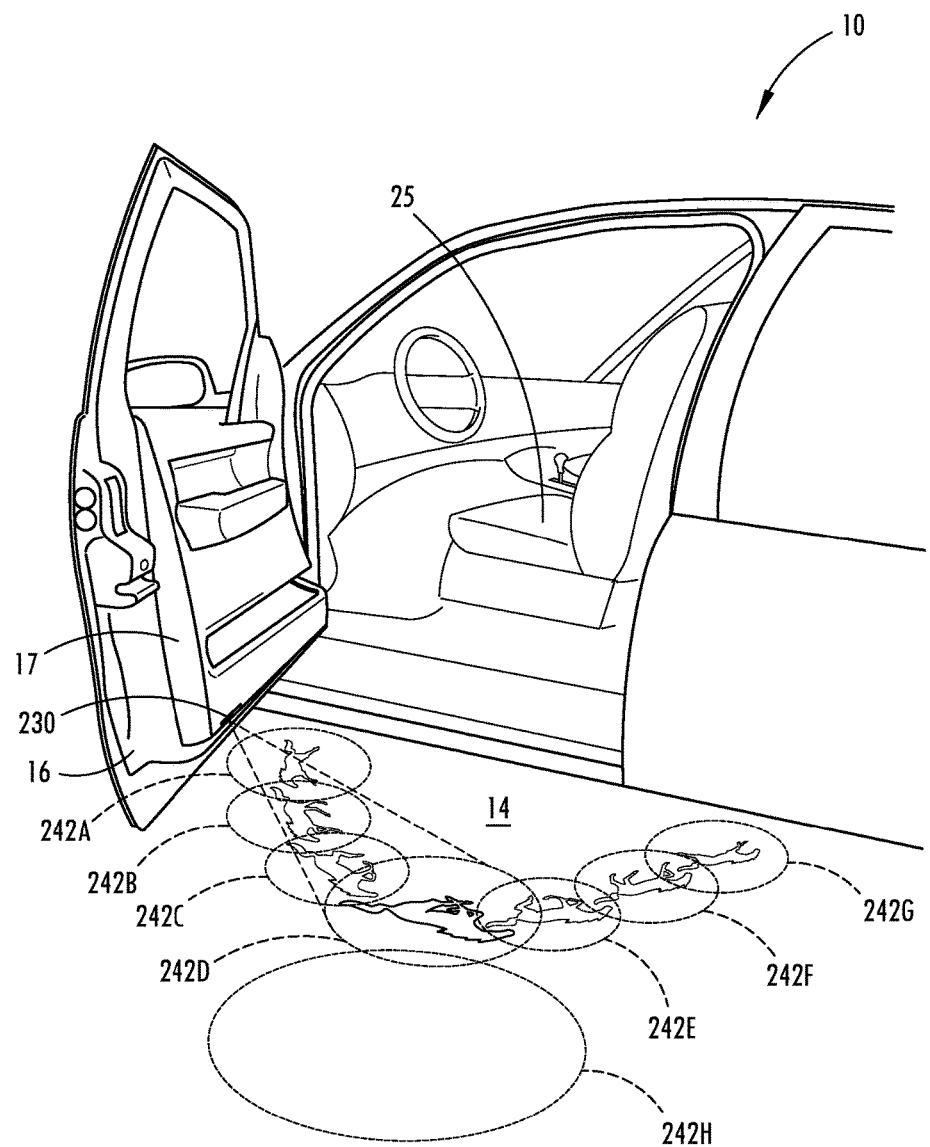
FIG. 8 is a perspective view of a portion of an automotive vehicle employing a puddle lamp assembly located on the driver door for generating a moving animated image on the ground, according to another embodiment.
Figure 9:
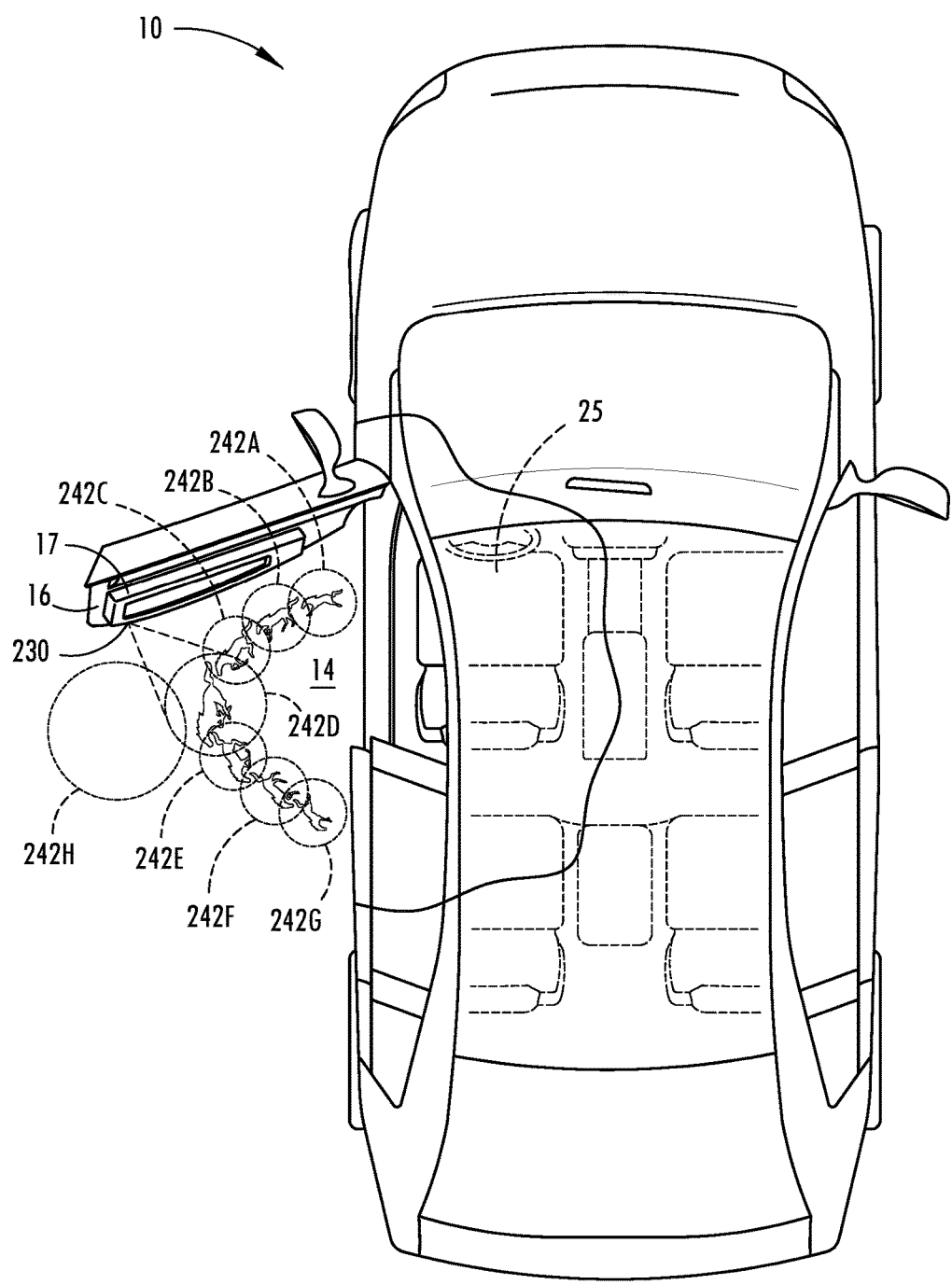
FIG. 9 is a top view of the vehicle further illustrating the moving animated lighted images projected onto the ground by the lamp assembly of FIG. 8.

In this embodiment, the vehicle puddle lamp assembly 230 is located in the interior trim panel 17 of the passenger door 16. As shown, the vehicle puddle lamp assembly 230 is mounted near the lower end of the trim panel 17 and oriented generally outward and downward through an opening in the trim panel 17 to sequentially generate animated lighted images 242A-242G and image 242H at different locations on the ground surface 14 generally below and rearward of the open door 16 as shown in FIG. 8 and outward from the door opening in a location where the driver of the vehicle 10 would step upon entering or exiting the vehicle 10. The puddle lamp assembly 230 is activated when the vehicle door 16 is in the open position as shown to illuminate the ground surface 14 and provide a moving animated image on the ground surface 14 as shown by lighted images 242A-242G. According to the embodiment shown, each of the images 242A-242G is generated by a separate light projector and the images 242A-242G are sequentially activated to give the appearance of both a moving image that moves location and an animated image that changes features of the image such as moving legs of a pony to give the appearance that the pony is running. When the vehicle door 16 is moved from the closed position to the open position, the lighted images 242A-242D are sequentially illuminated to give the appearance that the lighted image moves from a location underneath the vehicle 10 outward to a location distanced away from the vehicle 10. In one embodiment, when the vehicle door reaches the open position, lighted images 242A-242D are illuminated sequentially, one at a time, starting with first lighted image 242A and finishing with fourth image 242D. For example, the first lighted image 242A may be illuminated and turned off followed by sequential illuminations and deactivations of lighted images 242B, 242C and 242D. With the door 16 in the open position, a moving animated image is presented on the ground generally in the area where a driver of the vehicle may be positioned to exit the vehicle 10. In contrast, when the vehicle door 16 is moved from the open position to the closed position, the closing of the vehicle door 16 is sensed with an accelerometer 262 located in the door, and the sensed door closure is used to control the moving animated images to activate sequentially lighted images 242D-242G. With the door in the fully open position, image 242D is illuminated and may remain illuminated, according to one embodiment. When the vehicle door is sensed with the accelerometer 262 to be closing, lighted image 242D is deactivated and lighted image 242E is next illuminated and deactivated, followed by the sequential illuminations and deactivations of lighted images 242F and 242G. This sequential illumination and include a time delay such as one-quarter second between illuminations and gives the appearance of the animated images moving from the outward position away from the vehicle 10 to a location under the vehicle 10. As a result, when the vehicle door 16 is opened, the lighted image appears to move away from the vehicle, and when the vehicle door 16 is closed, the image appears to move to a location back under the vehicle 10.

According to another embodiment, the animated images 242A-242D may cyclically repeat when the vehicle door 16 moves from the closed position to the open position. As such, the animated images will appear to move repeatedly from a location under the vehicle 10 with lighted image 242A to the outward location with lighted image 242D. When the vehicle door 16 is moved from the open position to the closed position, the animated images 242D-242G are illuminated in sequence so that the moving animated images appears to move from the outward location with lighted image 242D to a location under the vehicle 10 with lighted image 242G. It should be appreciated that other sequential illuminations of images may be employed depending on the position of the door 16 and the expected position of the driver of the vehicle 10.

In addition, the lamp assembly 230 includes a further light projector for generating a further lighted image 242H. Lighted image 242H may be a light beam without a filtered image that serves as a larger general puddle area lamp for illuminating the ground surface 14 proximate to the vehicle 10 in an area where the driver of the vehicle 10 may further step or move upon entering or exiting the vehicle 10. The puddle lamp 242F serves as a general light illumination area lamp. Lighted image 242H may be illuminated when the vehicle door has moved to the fully open position following the sequential illumination of the images 242A-242D.

According to another embodiment, the lighted image 242H may be illuminated the entire time that images 242A-242D are illuminated to provide enhanced area lighting. According to another embodiment, lighted image 242H may be generated with filter that generates a desired image pattern.

Figure 10:
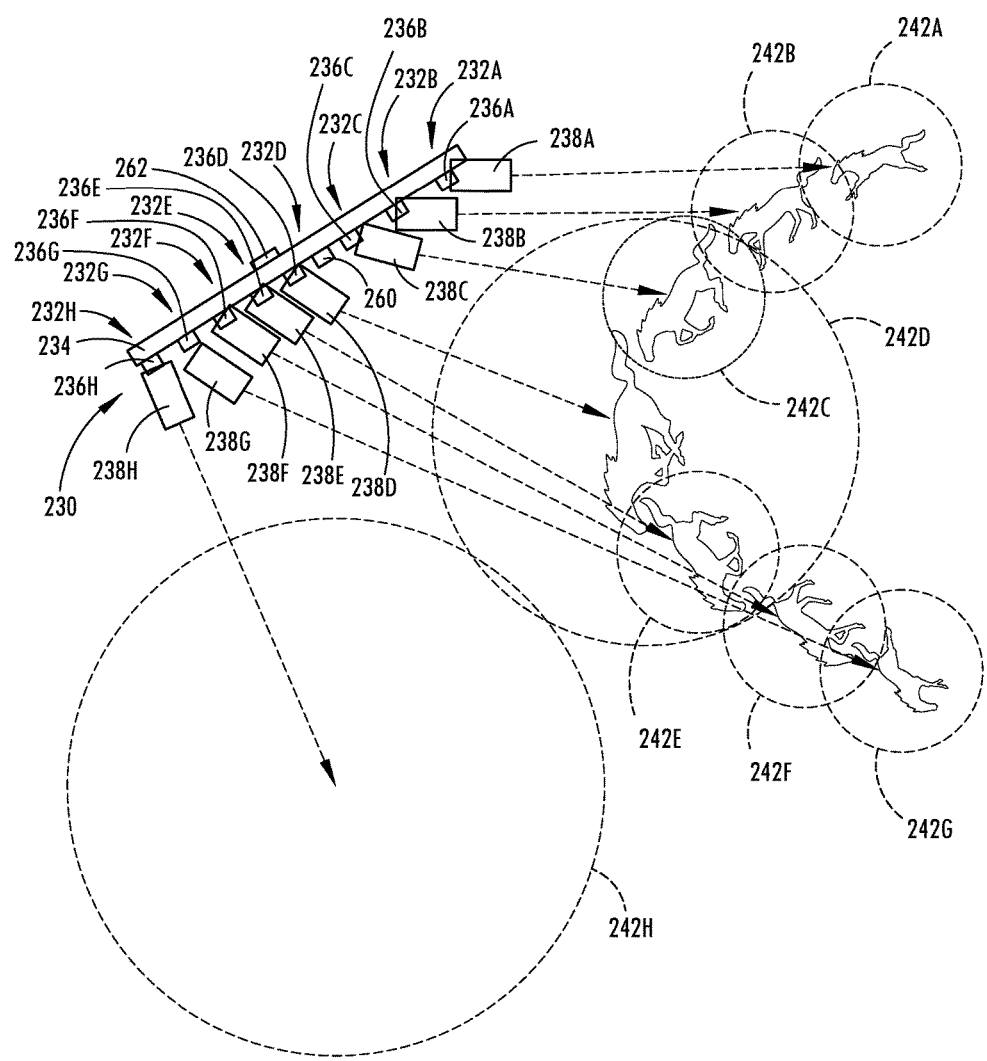
FIG. 10 is an enlarged side view of the lamp assembly for generating the moving animated lighted images shown in FIG. 8, according to one embodiment.

The puddle lamp assembly 230 may employ an arrangement of light projectors as is shown in FIG. 10, according to one embodiment. In this embodiment, the lamp assembly 230 is illustrated having eight light projectors 232A-232H for generating eight different lighted images 242A-242H, respectively. The lamp assembly 230 includes a first light projector 232A, a second light projector 232B, a third light projector 232C, a fourth light projector 232D, a fifth light projector 232E, a sixth light projector 232F, a seventh light projector 232G and an eighth light projector 232H, all shown arranged in a linear array on a support housing 234 and angled relative to one another so as to provide light illumination onto different target area locations on the ground surface 14. Each of the light projectors includes a light source 236A-236H, such as an LED, and an image filter 238A-238H. Each of the image filters 238A-238H may be arranged within the light output windows of the corresponding light sources 236A-236H, respectively, such that light output by the light sources 236A-236H is illuminated onto and passes through the respective image filters 238A-238H one at a time to provide the lighted image patterns 242A-242H projecting onto the ground surface 14. The image filters 238A-238H may include a light transparent film having either a positive or negative light transparent image pattern such as the pony shown in one example. The image filters 238A-238H each may further include optics such as a lens. Additionally, the lamp assembly 230 may have a printed circuit board containing a controller having control circuitry including LED drive circuitry for controlling activation and deactivation of the light sources 236A-236H and hence the light projectors 232A-232H similar to what is shown in FIG. 3 and described herein. The LEDs and filters may generate a visible light such as white light, red light or other color light. Each of projectors 232A-232G shown in FIG. 10 may be configured similar to projectors 32A-32C shown in FIG. 3.

The first light projector 232A may be activated such that the first light source 236A illuminates light onto the first image filter 238A to generate a lighted image pattern 242A at a first location on the ground surface 14. The second light projector 232B may be activated such that the second light source 236B illuminates light onto the second image filter 238B to generate a second lighted image pattern 242B on a second location on the ground surface 14. The third light projector 232C may be activated such that the third light source 236C generates a beam of light onto the third image filter 238C to generate a third lighted image pattern onto a third location on the ground surface 14. The fourth light projector 232D may be activated such that the fourth light source 236D illuminates light onto the first image filter 238D to generate a fourth lighted image pattern 242D on a fourth location on the ground surface 14. The fifth light projector 232E may be activated such that the fifth light source 236E illuminates light onto the fifth image filter 238E to generate a fifth light image pattern 242E at a fifth location on the ground surface 14. The sixth light projector 232F may be activated such that the sixth light source 236F illuminates light onto the sixth image filter 238F to generate a sixth lighted image pattern 242F at a sixth location on the ground surface 14. The seventh light projector 232G may be activated such that the seventh light source 236G illuminates light onto the seventh image filter 238G to generate a seventh lighted image pattern 242G at a seventh location on the ground surface 14. The eighth light projector 232H may be activated such that the eighth light source 236H illuminates light with or without a filter to generate an eighth lighted image pattern, shown as a circle, on the ground surface 14.

It should be appreciated that the light projectors 232A-232D are activated and then deactivated one at a time in a successive sequence at a rapid rate to generate an animated imaging moving on the ground 14 from the first location to the fourth location when the door is moved from the closed position into the open position. In doing so, each light projector 232A-232D may be turned on for an activation time period in the range of 50 to 500 milliseconds, and more preferably 50 to 200 milliseconds, and then turned off and the next sequential light projector immediately or following a time delay such as 0.25 seconds turned on and then off so as to generate the appearance of a moving lighted image, such as an animated running mustang moving from under the vehicle to an outward position or location. The sequentially generated images may be configured to generate an animated image that has image parts that appear to move and the images themselves move over four locations. The activation time period could be extended to 1.5 seconds, according to embodiments that generate a slower moving image. The light projectors 232D-232G may be activated and deactivated one at a time in a successive sequence at a rapid rate to generate an animated image moving from the outward location to the location underneath the vehicle 10 when the vehicle door 16 closes. In doing so, each light projector may be turned on for an activation time period in the range of about 50 to 500 milliseconds, and more preferably 50 to 250 milliseconds, and then turned off and the next sequential light projector turned on immediately or following a time delay such as 0.25 seconds and so as to generate the appearance of a moving lighted image that moves over four locations from the outward location to underneath the vehicle when the vehicle door 16 is sensed being closed. The activation time period could be extended up to 1.5 seconds, according to embodiments that generate a slower moving image.

Figure 11:
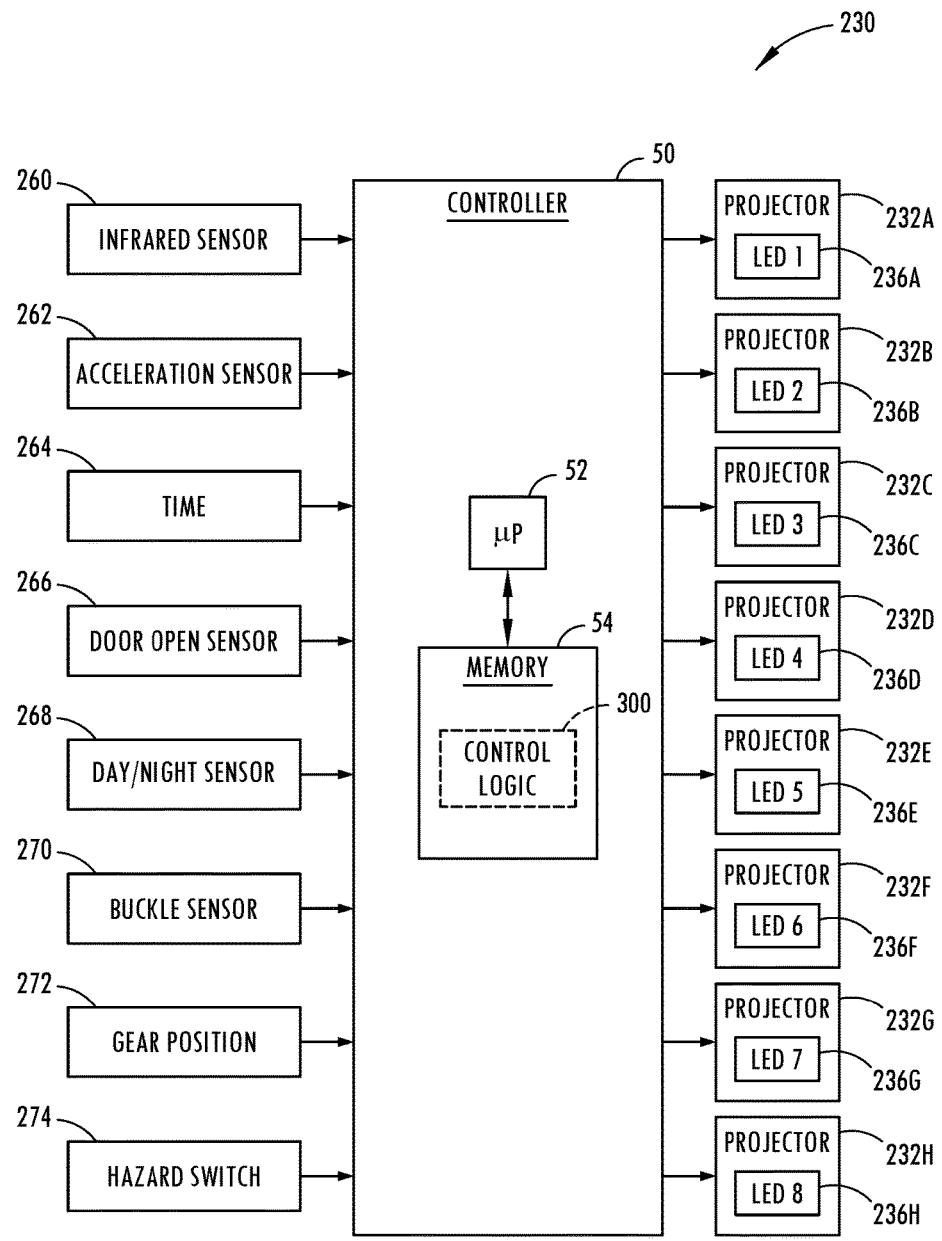
FIG. 11 is a block diagram further illustrating the puddle lamp assembly of FIG. 8.

Referring to FIG. 11, the vehicle puddle lamp assembly 230 is further illustrated having a controller 50 receiving various inputs and controlling each of the eight light projectors 232A-232H, by applying signals to the light sources 236A-236H. The controller 50 may include a microprocessor 52 and memory 54 as illustrated, according to one embodiment. It should be appreciated that the controller 50 may include control circuitry such as analog and/or digital control circuitry. Stored within memory 54 and executed by the microprocessor 52 is a control routine 300 for processing the various inputs and controlling each of the plurality of light projectors 232A-232H as described herein. The inputs to the controller 50 may include an infrared sensor 260 located on lamp assembly housing 234 on the vehicle 16 or elsewhere on the vehicle for sensing the foot or a driver or other passengers moving out of the vehicle 10, and an acceleration sensor (accelerometer) 262 for detecting acceleration of the vehicle door 16 moving from the open position to the closed position. In addition, inputs may include a time signal 264 for providing timing synchronization and a door open sensor 266 for sensing that the vehicle door 16 is in the opened position. Further inputs include a day/night sensor 268 for sensing a dark or lighted environmental condition, and a buckle sensor 270 for sensing that the vehicle seat buckle is buckled, thus indicative of the driver of the vehicle being in the vehicle seated in the seat 25. The inputs further include a gear position 272 indicative of the transmission gear of the vehicle to indicate whether or not the vehicle may be stopped (e.g., in park) or moving (e.g., not in park). Finally, the inputs further include a hazard switch 274 for providing a signal indicative of a vehicle hazard warning which may be used when the door is open to flash all or some of the light projectors of lamp assembly 230. The controller 50 processes the various inputs 262-274 and generates control outputs pursuant to the control routine 300 to activate the light projectors 232A-232H as described herein.

Figure 12A:
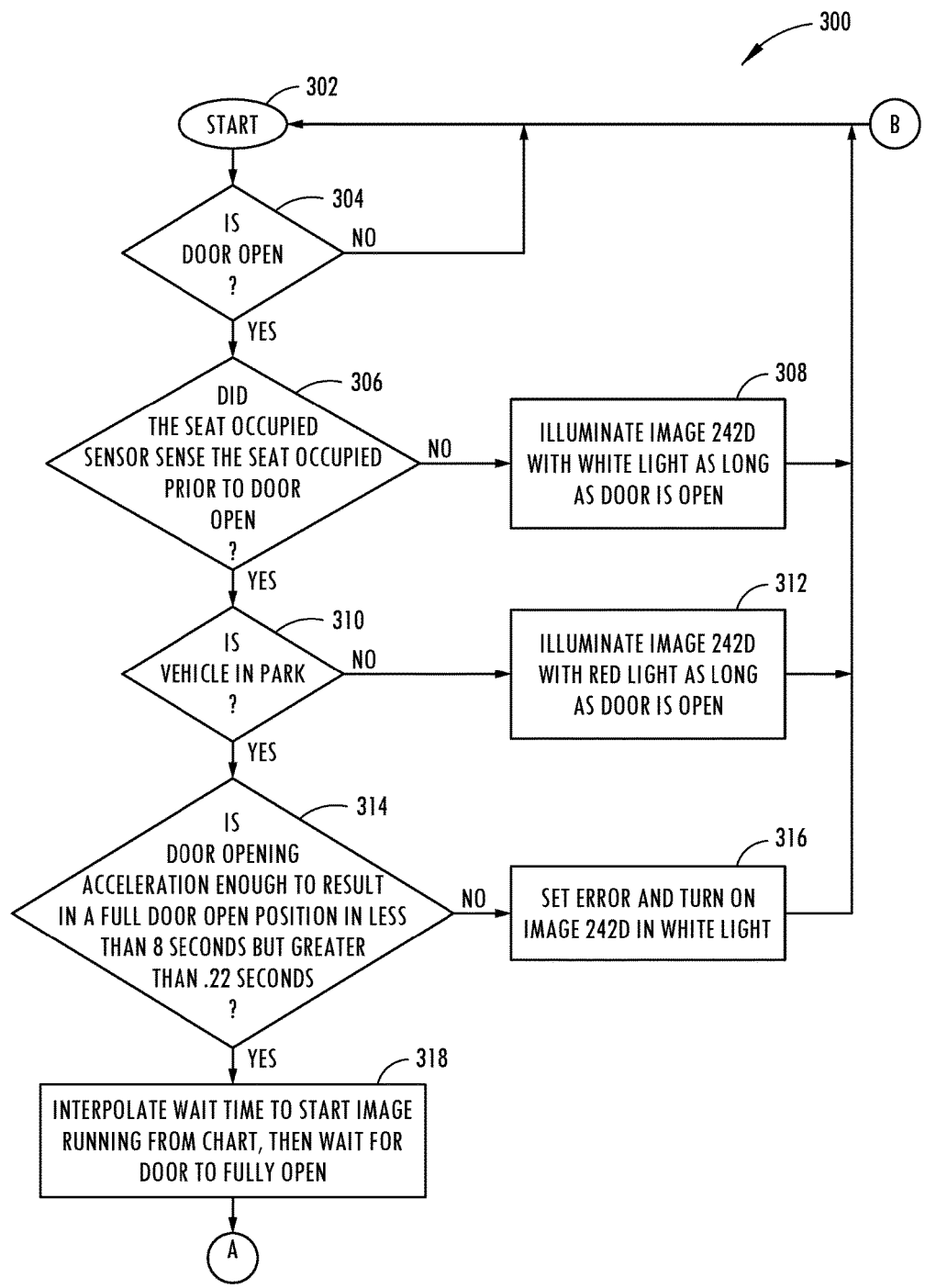
FIGS. 12A and 12B are a flow diagram illustrating a routine for controlling activation of the light projectors of the lamp assembly shown in FIG. 8, according to one embodiment.
Figure 12B:
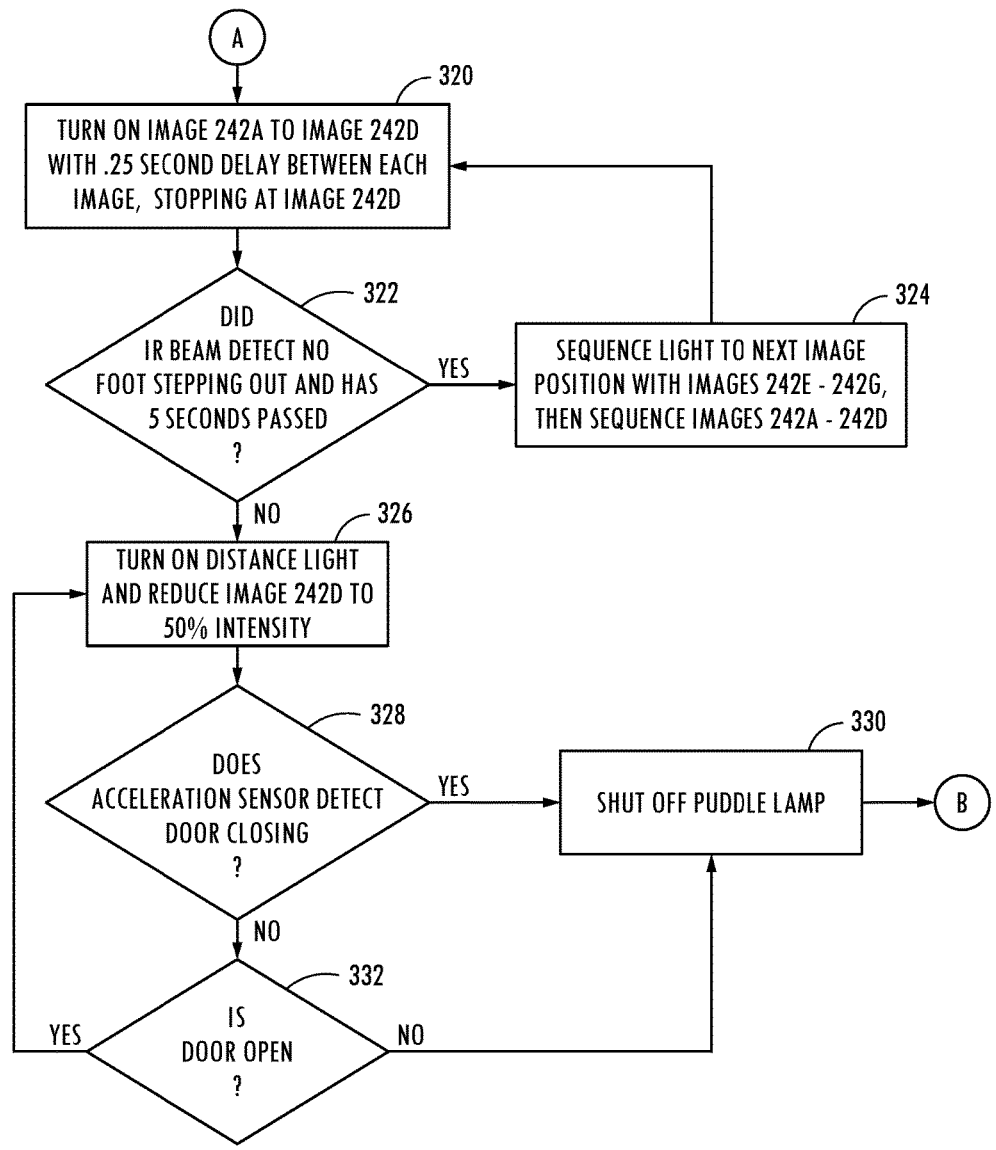

Referring to FIGS. 12A-12B, the control routine 300 for activating and controlling the vehicle puddle lamp assembly 230 is illustrated, according to one embodiment. Routine 300 begins at step 302 and proceeds to decision step 304 to determine if the door is open which may be sensed by the door open sensor such as the door courtesy switch and, if the door is not open, returns. If the door is determined to be open, routine 300 proceeds to decision step 306 to determine if the seat occupied sensor senses the seat occupied prior to the door being open and, if not, illuminates the fourth image 242D with white light at step 308 as long as the door is open, before returning. If the seat occupied sensor does not sense the seat occupied by a driver or passenger prior to the door sensed in the open position, routine 300 proceeds to decision step 310 to determine if the vehicle is in park. If the vehicle is not in park, routine 300 proceeds to step 312 to illuminate the fourth image 242D with red light as long as the door is sensed in the open position, before returning. If the vehicle is in park, routine 300 proceeds to decision step 314 to determine if the sensed door opening acceleration is enough to result in a full door open position a time period of less than 8 seconds but greater than 0.22 seconds and, if not, generates an error signal and turns on the fourth image 242D in white light at step 316, before returning. The acceleration sensor may sense the door opening. If the sensed door open acceleration is enough to result in a full door open position in less than 8 seconds but greater than 0.22 seconds, routine 300 proceeds to step 318 to interpolate a wait time to start the moving animated image (e.g., pony) running from a chart, then waits for the door to fully open. Thereafter, routine 300 proceeds to step 320 to turn on in sequence the first through fourth images 242A-242D with 0.25 second delay between each light illumination, and stopping at the fourth image 242D. Next, at decision step 322, routine 300 determines if the infrared (IR) sensor beam detects no foot stepping out from the vehicle and that a time of 5 seconds has passed. If the IR sensor beam did not detect a foot stepping out and 5 seconds has passed, routine 300 proceeds to step 324 to sequence the light to the next image positions at images 242E-242G, such that the animated image appears to move from the outward location to a location under the vehicle, and then sequences images 242A-242D, before returning to step 320. If the IR sensor beam does not detect no foot stepping out over 5 seconds, routine 300 proceeds to step 326 to turn on the distance light and to reduce image 242D to 50% intensity. Next, at decision step 328, routine 300 determines if the acceleration signal detects the door closing and, if so, shuts off the puddle lamp at step 330, and then returns. If the acceleration sensor does not detect the door closing, routine 300 proceeds to decision step 332 to determine if the door is open and, if not, shuts off the puddle lamp. Otherwise, routine 300 returns to step 326.

Accordingly, the vehicle puddle lamp assembly 320 advantageously provides for moving and animated lighted images on the ground 14 next to a vehicle 10 in response to detecting a vehicle door 16 moving from the closed to the open position or from the open to closed position. As such, the animated image illuminates the ground surface 14 where a driver of the vehicle may step and provides enhanced lighting on the ground surface 14 exterior to the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle puddle lamp assembly comprising:
a plurality of light projectors located on a vehicle and configured to illuminate different lighted image patterns on a surface adjacent to the vehicle;
an acceleration sensor sensing a passenger door moving to a fully open position; and
a controller sequentially activating the plurality of light projectors one at a time to generate a moving animated lighted image on the ground surface only when the door is determined in the fully open position.

2. The lamp assembly of claim 1, wherein the controller turns the plurality of light projectors on and off one projector at a time.

3. The lamp assembly of claim 2, wherein the controller turns one of the light projectors on for a time period in the range of 50 to 500 milliseconds.

4. The lamp assembly of claim 1, wherein the plurality of light projectors comprises first, second and third projectors, each comprising a light source and a filter operatively coupled to the light source for generating the image pattern.

5. The lamp assembly of claim 1, wherein the plurality of light projectors are located on the passenger door for generating lighted image patterns on a ground surface adjacent to a vehicle door.

6. The lamp assembly of claim 1, wherein each of the plurality of light projectors comprises a light source and a filter comprising an image pattern located in front of the light source.

7. The lamp assembly of claim 1, wherein the animated lighted image moves away from the vehicle when the door is determined in the fully open position.

8. The lamp assembly of claim 7, wherein the animated lighted image moves toward the vehicle when the door is sensed moving to a closed position.

9. The lamp assembly of claim 8, wherein the acceleration sensor further senses the door moving to the closed position.

10. A vehicle puddle lamp assembly comprising:
a plurality of light projectors located on a door of a vehicle and configured to illuminate different lighted image patterns one at a time on a surface adjacent to the vehicle;
a sensor sensing a passenger door position; and
a controller sequentially activating the plurality of light projectors to project a moving lighted image towards the vehicle and on the ground surface only when the door is fully open.

11. The lamp assembly of claim 10, wherein the controller generates an animated moving image, and wherein the assembly further comprises a puddle lamp for illuminating the surface adjacent to the vehicle.

12. The lamp assembly of claim 10, wherein the controller generates a first movement of the lighted image when the vehicle door is determined in the fully open position.

13. The lamp assembly of claim 12, wherein the lighted image moves away from the vehicle when the door is determined in the fully open position.

14. The lamp assembly of claim 12, wherein the controller generates a second movement of the lighted image when the vehicle door is sensed moving to a closed position.

15. A method of generating a lighted image with a vehicle puddle lamp assembly, comprising:
receiving a signal to activate a vehicle puddle lamp;
determining a vehicle door moving to an open position; and
sequentially activating a plurality of light projectors one at a time located on the vehicle door and configured to illuminate different light patterns towards the vehicle and onto a surface adjacent to the vehicle to generate a lighted image that appears to move outward on the ground surface from underneath the vehicle to a location distanced from the vehicle only when the vehicle door is determined in a fully open position.

16. The method of claim 15, wherein the lighted image is an animated lighted image.

17. The method of claim 15, wherein the step of sequentially activating the plurality of light projectors comprises turning the plurality of light projectors on and off one projector at a time.

18. The method of claim 17, wherein the step of sequentially activating the plurality of light projectors comprises turning one of the light projectors on for a time period in the range of 50 to 500 milliseconds.

19. The method of claim 15, wherein the plurality of light projectors each comprises a light source and a filter operatively coupled to the light source for generating an image pattern.

20. The method of claim 15, wherein the plurality of light projectors are located on the vehicle door for generating lighted image patterns on a ground surface adjacent to the vehicle door.

* * * * *